(12) United States Patent
Egawa et al.

(10) Patent No.: US 8,128,154 B2
(45) Date of Patent: Mar. 6, 2012

(54) VEHICLE FLOOR STRUCTURE

(75) Inventors: Yasuhisa Egawa, Sakura (JP); Shigeto Yasuhara, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 160 days.

(21) Appl. No.: 12/529,669

(22) PCT Filed: Mar. 24, 2008

(86) PCT No.: PCT/JP2008/055388
§ 371 (c)(1),
(2), (4) Date: Nov. 18, 2009

(87) PCT Pub. No.: WO2008/132909
PCT Pub. Date: Nov. 6, 2008

(65) Prior Publication Data
US 2010/0066125 A1    Mar. 18, 2010

(30) Foreign Application Priority Data

Apr. 20, 2007 (JP) ................ 2007-111555
Apr. 20, 2007 (JP) ................ 2007-111557

(51) Int. Cl.
*B62D 25/20* (2006.01)
(52) U.S. Cl. ............ 296/187.12; 296/204; 296/209; 296/193.07
(58) Field of Classification Search ............ 296/187.12, 296/193.05, 203.03, 209, 204, 193.07
See application file for complete search history.

(56) References Cited

U.S. PATENT DOCUMENTS

| | | | | |
|---|---|---|---|---|
| 4,582,357 A | * | 4/1986 | Nakamura et al. | 296/203.03 |
| 5,370,438 A | * | 12/1994 | Mori et al. | 296/203.02 |
| 6,547,318 B2 | * | 4/2003 | Takeuchi | 296/204 |
| 6,857,691 B2 | * | 2/2005 | Kuroda et al. | 296/203.02 |
| 7,104,595 B2 | * | 9/2006 | Kamura et al. | 296/193.07 |
| 2006/0158008 A1 | | 7/2006 | Nagashima | |
| 2006/0232105 A1 | | 10/2006 | Egawa et al. | |

FOREIGN PATENT DOCUMENTS

| | | |
|---|---|---|
| EP | 1712454 | 10/2006 |
| JP | 09-290775 | 11/1997 |
| JP | 2000-108930 | 4/2000 |
| JP | 2004-168175 | 6/2004 |
| JP | 2005-119492 | 5/2005 |
| JP | 2006-199132 | 8/2006 |
| JP | 2006-298076 | 11/2006 |

* cited by examiner

*Primary Examiner* — Glenn Dayoan
*Assistant Examiner* — Pinel Romain
(74) *Attorney, Agent, or Firm* — Rankin, Hill & Clark LLP

(57) ABSTRACT

A vehicle floor structure including: a floor tunnel frame arranged along a center in a vehicle width direction and extending in a vehicle length direction; side sills arranged on the right and left sides of a vehicle body and extending in the length direction; lateral frame members connecting the tunnel frame with the side sills; floor panels bridged between the tunnel frame and the side sills; obliquely extending portions provided on at least one of the lateral frame members and extending so as to be inclined to the length direction in a planar view, connecting respectively with the side sills; and concentric arc-shaped beads provided in the respective panels, with centers respectively at intersections of the side sills and the obliquely extending portions, wherein at least one of the beads has one end extending orthogonal to the side sill and the other end extending orthogonal to the width direction.

1 Claim, 12 Drawing Sheets

VEHICLE FLOOR STRUCTURE

TECHNICAL FIELD

The present invention relates to a vehicle floor structure. Priority is claimed on Japanese Patent Application No. 2007-111555 filed Apr. 20, 2007, and Japanese Patent Application No. 2007-111557 filed Apr. 20, 2007, the contents of which are incorporated herein by reference.

BACKGROUND ART

In some of the vehicle floor structures, convex-shaped or concave-shaped beads are provided over substantially the entirety of a floor panel, the beads centered around portions where side sills go across cross members (for example, see Patent Document 1).

These beads can remarkably increase the rigidity of the floor panel while reducing the weight of a vehicle body. That is, in a floor panel provided with beads in this manner, a load applied to the floor panel is transmitted in directions in which the beads extend. Therefore, this property is used to transmit a collision load at the time of a frontal vehicular collision or a rear vehicular collision to side sills via the floor panel. This allows the load to be distributed. As a result, the load borne by the individual members can be decreased.

Patent Document 1: Japanese Unexamined Patent Publication, First Publication No. 2006-298076

However, in the above-mentioned prior art, there are cases where a floor panel is bent as a result of the beads failing to resist a load when a collision load is transmitted to the floor panel at the time of a frontal vehicular collision or a rear vehicular collision. When the floor panel is deformed like this, the problem is that transmission of the load to side sills is obstructed, preventing the load from being distributed.

Furthermore, in the above-mentioned prior art, the beads provided on the floor panel make it possible to enhance the rigidity of the floor panel itself. However, at the side collision of a vehicle, the problem is that the impact load which acts from a side portion does not sufficiently act on the floor panel, that is, the impact load cannot be effectively received by the entirety of the floor panel. Moreover, when it is configured such that this impact load is received only by the floor panel, the rigidity of the floor panel must be further enhanced. This increases vehicle weight, leading to problems with improvements in fuel efficiency.

Therefore, it is an object of the present invention to provide a vehicle floor structure which, at the time of a frontal vehicular collision or a rear vehicular collision, is unlikely to deform and is capable of effectively distributing a collision load.

Furthermore, it is another object of the present invention to provide a vehicle floor structure which effectively transmits an impact load acting at the time of a side vehicular collision to a floor panel and is capable of decreasing a load borne by the floor panel.

DISCLOSURE OF INVENTION

In order to solve the above described problems, the present invention employs the followings. Namely, the present invention employs a vehicle floor structure including: a floor tunnel frame arranged along a center in a vehicle width direction and extending in a vehicle length direction; side sills arranged on the right and left sides of a vehicle body and extending in the vehicle length direction; a plurality of lateral frame members for connecting the floor tunnel frame with the right and left side sills in the vehicle width direction; floor panels bridged between the floor tunnel frame and the side sills; obliquely extending portions which are provided on at least one of the plurality of lateral frame members and extend so as to be inclined with respect to the vehicle length direction in a planar view, connecting respectively with the side sills; and a plurality of concentric arc-shaped beads which are provided in respective regions surrounded by the floor tunnel frame, the side sills, and the lateral frame members, with centers respectively at intersections of the side sills and the obliquely extending portions, wherein at least one of the beads in the respective regions has one end extending so as to be orthogonal to the side sill and the other end extending so as to be orthogonal with respect to the vehicle width direction.

According to the above described vehicle floor structure, a collision load acting on the lateral frame members at the time of a frontal vehicular collision or a rear vehicular collision is directly transmitted to the side sills via the obliquely extending portions of the lateral frame member and also transmitted to the side sills via the floor panel. At least a part of the beads of the floor panel have one end each extending so as to be orthogonal to the side sill, and the other end each extending so as to be orthogonal to the lateral frame member. Consequently, the beads can receive and hold a collision load in a head-on manner. This makes the beads unlikely to be bent and makes the floor panel unlikely to be deformed. As a result, the distribution of a load over the side sills via the floor panel can be effectively performed. Furthermore, a floor frame for use in a conventional vehicle floor structure which is fixed on a floor panel for bearing a collision load acting on lateral frame members at the time of a frontal vehicular collision or a rear vehicular collision and which extends in the longitudinal direction can be omitted. Therefore, it is possible to reduce the weight of a vehicle.

It may be arranged such that the lateral frame member which connects a front end portion of the floor tunnel frame with front end portions of the side sills includes outriggers connected to the side sills and extensions connected to the floor tunnel frame; the outrigger includes, at a front end thereof, a front side frame which extends in the vehicle length direction; and the other end of each of the beads extends so as to be orthogonal the vehicle width direction within a width of the front side frame.

In this case, a collision load at the frontal vehicular collision is directly transmitted to the side sills via the outriggers, and also to the side sills via the floor panel, and furthermore to the floor tunnel frame via the extensions. Consequently, the collision load is distributed, and hence the load burden on the floor tunnel frame and the floor panel can be decreased. As a result, a degree of reinforcement for the floor tunnel frame can be decreased, making weight reduction of the floor tunnel frame possible. A load burden on the floor panel is also decreased, making weight reduction of the floor panel also possible. Furthermore, because the other end of each of the beads extends so as to be orthogonal with respect to the vehicle width direction within a width of the front side frame, the beads can receive and hold a collision load in a head-on manner at the time of a frontal vehicular collision. This makes the beads unlikely to be bent and makes the floor panel unlikely to be deformed. As a result, distribution of a collision load over the side sills via the floor panel can be effectively performed.

It may be arranged such that the lateral frame member which connects a rear end portion of the floor tunnel frame with rear end portions of the side sills has a linear portion which connects with the obliquely extending portions and extends orthogonally with respect to the vehicle length direction; connection portions between the obliquely extending portions and the linear portion include a reinforcement member; and the other end of each of the beads extends so as to be orthogonal with respect to the linear portion.

In this case, a collision load at a rear vehicular collision is directly transmitted to the side sills via the obliquely extending portions of the lateral frame member, and also to the side sills via the floor panel. As a result, the load burden on the floor panel can be decreased. Furthermore, because in the lateral frame member, the connection portions between the obliquely extending portions and the linear portion are reinforced by the reinforcement members, the lateral frame member is unlikely to be deformed at the time of a rear vehicular collision. As a result, a load distribution over the side sills can be effectively performed. Furthermore, because the other end of each of the beads extends so as to be orthogonal with respect to the linear portion of the lateral frame member, the beads can receive and hold a collision load in a head-on manner at the time of a rear vehicular collision. As a result, the beads are unlikely to be bent and the floor panel are unlikely to be deformed. As a result, the distribution of a load over the side sills via the floor panel can be effectively performed.

It may be arranged such that the lateral frame member which connects a front end portion of the floor tunnel frame with front end portions of the side sills includes extensions which extend so as to be inclined with respect to the vehicle length direction in a planar view, connecting with the floor tunnel frame; and the extensions are adjacent to the other ends of the beads.

In this case, a load acting on a vehicle body, especially on an anterior chamber, at the time of a frontal vehicular collision is transmitted to the side sills via the beads of the floor panel, and the load is also more effectively transmitted to the floor tunnel frame via the extensions. As a result, the load acting on the anterior chamber portion of the vehicle body can be more effectively distributed.

The present invention also employs a vehicle floor structure including: a floor tunnel frame arranged along a central portion in a vehicle width direction and extending in a vehicle length direction; side sills arranged in the vehicle width direction and extending in the vehicle length direction; a plurality of lateral frame members for connecting the floor tunnel frame with the right and left side sills in a vehicle width direction; floor panels bridged between the floor tunnel frame and the side sills; and a plurality of concentric arc-shaped beads which are provided in respective regions surrounded by the floor tunnel frame, the side sills, and the lateral frame members, with respective centers at intersections of the side sills and the lateral frame members, ends of the beads starting perpendicularly from inside walls of the side sill inners, wherein the side sill includes: a side sill inner which linearly extends in the vehicle length direction and is joined to an outside edge of the floor panel, the side sill having a U-shaped cross-section opening toward the outside of the vehicle body; a side sill reinforcement member which is joined to the outside edge of the vehicle body of the side sill inner via upper and lower joint flange portions, and has a U-shaped cross-section opening toward the inside of the vehicle body, the side sill reinforcement member together with the side sill inner forming a closed section structure; a front inclined wall provided to an outside wall of the side sill reinforcement member, the front inclined wall protruding more toward the outside from a front end thereof to a central portion in the vehicle length direction; and a rear inclined wall provided to the outside wall of the side sill reinforcement member, the rear inclined wall protruding more toward the outside from a rear end thereof to the central portion in the vehicle length direction.

According to the above-mentioned vehicle floor structure, an impact load acting from the side sill at the time of a side vehicular collision is transmitted from the side sill to the floor panel, and also transmitted in a distributed manner from the front inclined wall and rear inclined wall of the side sill reinforcement member to the lateral frame member. As a result, the burden applied to the floor panel can be decreased. Furthermore, the provided beads enhance the rigidity of the floor panel. Consequently, the weight of the floor panel can be reduced, thus contributing to improvements in fuel efficiency. Furthermore, the load transmitted to the side sill acts on the floor tunnel frame via the floor panel, and also is transmitted in a distributed manner in the direction of the lateral frame member by the concentric arc-shaped beads starting from the inner wall of the side sill. As a result, the burden applied to the floor panel can be decreased, and the weight of the floor panel can be reduced. This can contribute to improvements in fuel efficiency.

According to the present invention, the collision load at the time of a frontal vehicular collision, a rear vehicular collision, or a side vehicular collision can be effectively distributed. Therefore the load burden on the floor panel can be decreased. Furthermore, the weight of the floor panel and the like can be reduced, which can contribute to improvements in the fuel efficiency of a vehicle.

DESCRIPTION OF THE REFERENCE SYMBOLS

Figure 1:
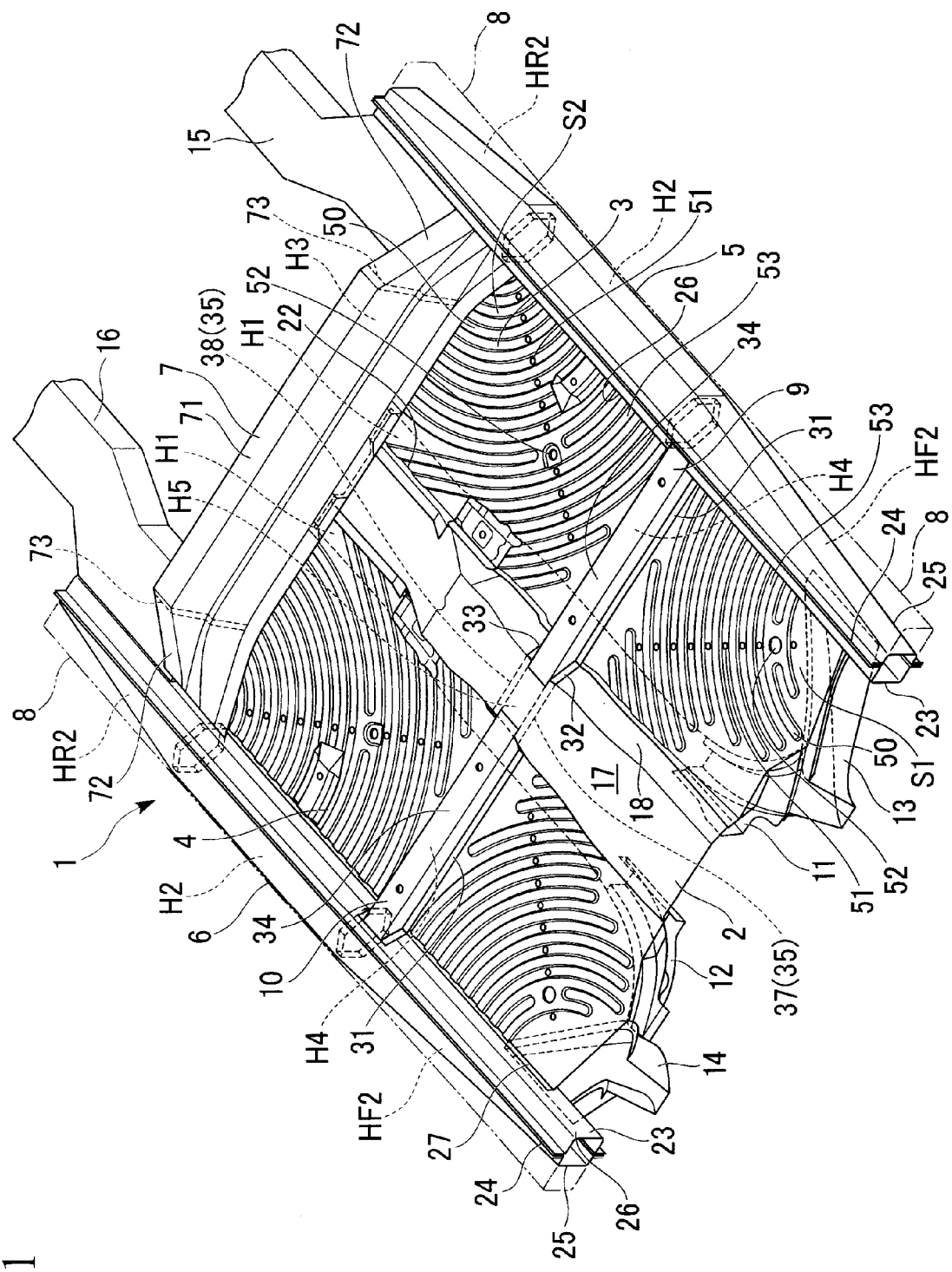
FIG. 1 is an exterior perspective view of a floor for a vehicle according to a first embodiment of the present invention.

1: floor
2: floor tunnel frame 3, 4: floor panel
5, 6: side sill
7: middle cross member (lateral frame member)
9, 10: front cross member (lateral frame member)
11, 12: extension (lateral frame member)
13, 14: outrigger (lateral frame member, obliquely extending portion)
50: bead
72: forwardly inclined portion (obliquely extending portion)
73: bulkhead (reinforcement member)
74: front side frame
S1: forward region (substantially rectangular region)
S2: backward region (substantially rectangular region)
102: floor tunnel frame (floor panel)
103, 104: floor panel
105, 106: side sill
107: middle cross member (lateral frame member)
111: extension (lateral frame member)
113: outrigger (lateral frame member)
123: side sill inner
124: joint flange portion
125: reinforcement (lateral sill reinforcement member)
125F: front inclined wall
125R: rear inclined wall
150: bead
H102, HF102, HR102: closed section structure
S101, S102: region
X101, X102: intersection

BEST MODE FOR CARRYING OUT THE INVENTION

Hereunder is a description of a first embodiment of a vehicle floor structure according to the present invention, with reference to drawings from FIG. 1 to FIG. 10. In the following description, the vertical direction, the longitudinal direction, and the lateral direction respectively refer to the vertical direction, the longitudinal direction, and the lateral direction of a vehicle body.

Figure 2:
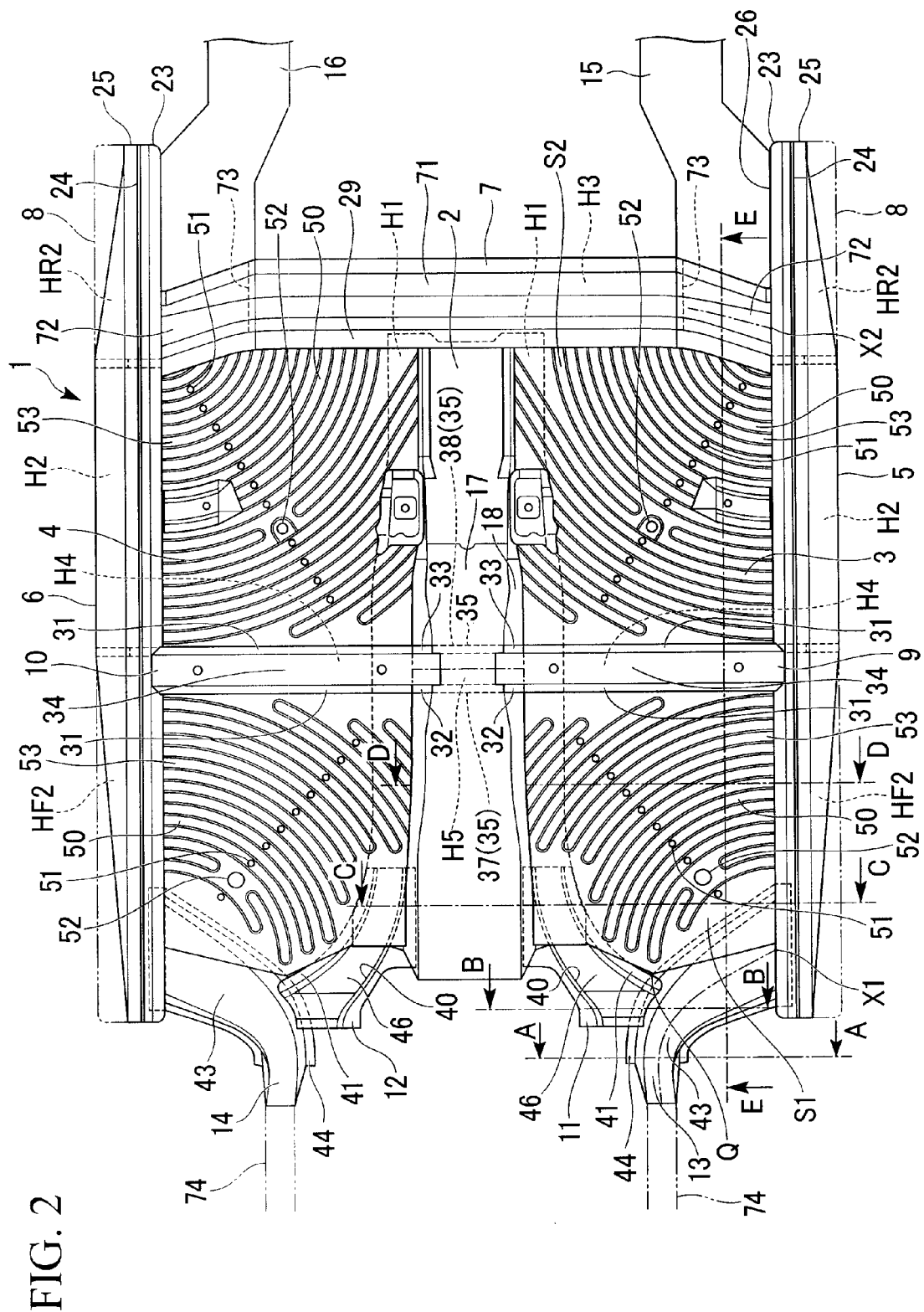
FIG. 2 is a planar view of the floor for a vehicle according to the same embodiment.

As shown in FIG. 1 and FIG. 2, in a floor 1 of a vehicle, a floor tunnel frame 2 extending in the vehicle length direction is formed along a central portion in the vehicle width direction. To both edges of this floor tunnel frame 2, there are joined inside edges of left and right floor panels 3, 4. To outside edges of the left and right floor panels 3, 4, there are fixed left and right side sills 5, 6, which are vehicular frame members extending in the vehicle length direction. That is, the left and right floor panels 3, 4 are bridged respectively between the floor tunnel frame 2 and the left and right side sills 5, 6. Rear portions of the left and right side sills 5, 6 are connected to each other by means of a middle cross member (lateral frame member) 7 which is a vehicular frame member. A front edge portion of the middle cross member 7 is joined to rear edge portions of the left and right floor panels 3, 4. Furthermore, a substantially central portion in the longitudinal direction of the floor tunnel frame 2 is connected to the left and right side sills 5, 6 by means of left and right front cross members (lateral frame members) 9, 10, respectively.

On the other hand, to walls of both sides of a front end portion of the floor tunnel frame 2, there are respectively joined one end of each of extensions 11, 12. To front end portions of the left and right side sills 5, 6, there are respectively joined one end of each of outriggers 13, 14. These left and right extensions 11, 12 are respectively connected to inside walls of the outriggers 13, 14. In the present embodiment, the floor panels 3, 4 and the floor tunnel frame 2 are main components of the floor 1.

Figure 3:
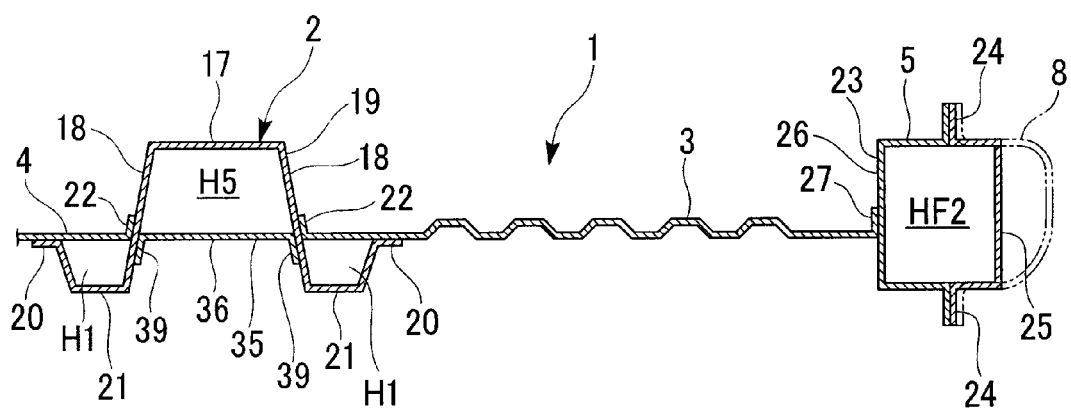
FIG. 3 is a cross-sectional view, taken along the D-D line of FIG. 2.

As shown in FIG. 3, the floor tunnel frame 2 is made of a tunnel main body 19 and wing portions 21, 21. The tunnel main body 19 is made of a top wall 17 and two inclined side walls 18, 18 so as to form a convex above floor panels 3, 4. The wing portions 21, 21 extend outwardly in a horizontal direction from both bottom ends of the inclined side walls 18, 18 of the tunnel main body 19 extending below surfaces of the left and right floor panels 3, 4, and respectively welded onto bottom surfaces of the floor panels 3, 4 in flange portions 20. On inside edges of the left and right floor panels 3, 4, there are respectively formed flange portions 22 in a rising manner. These flange portions 22 are welded onto both the side walls 18, 18 of the tunnel main body 19 of the floor tunnel frame 2.

That is, outside both the side walls 18, 18 of the floor tunnel frame 2, and below the floor panels 3, 4, there are formed closed section structures H1 formed of the wing portions 21, 21 of the floor tunnel frame 2 and the floor panels 3, 4.

Each of the side sills 5, 6 is made of: a side sill inner 23 formed in a convex shape on the vehicle interior side; a reinforcement 25; and side sill outers 8. The reinforcement 25 is joined to the side sill inner 23 in top and bottom joint flange portions 24, 24 to form a closed section structures. The side sill outers 8 are joined to the joint flange portions 24 to form closed section structures outside the reinforcement 25. The side sill inner 23 is formed in the same cross-sectional shape over substantially all the length. On the other hand, as shown in FIG. 1 and FIG. 2, the reinforcement 25 is formed so as to have a more outwardly protruding dimension as it extends from the front and rear ends to the center in the longitudinal direction. Thereby, inclined closed section structures HF2, HR2 are formed. A maximally protruded, closed section structure H2 in the reinforcement 25 whose protruding dimension to the outside is maximum is formed over a predetermined length in the vehicle length direction. The maximally protruded, closed section structures H2 are arranged between the middle cross member 7 and the front cross members 9, 10. To inside walls 26 of the side sill inners 23, there are respectively joined flange portions 27 which are formed at outside edges of the left and right floor panels 3, 4 in a rising manner.

Figure 4:
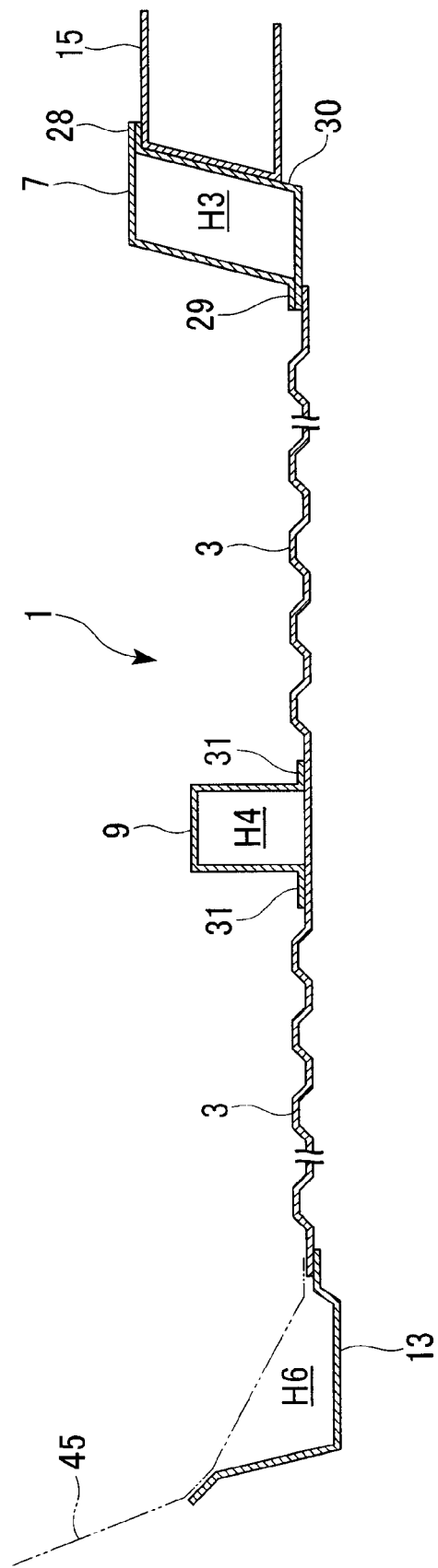
FIG. 4 is a cross-sectional view, taken along the E-E line of FIG. 2.

As shown in FIG. 4, the middle cross member 7 is formed of two opposingly arranged members with substantially an L-shaped cross-section, in which rear top edge flange portions 28 of the respective members are welded onto opposing front bottom edge flange portions 29 of the members, respectively. This middle cross member 7 forms a closed section structure H3 with a substantially rectangular shape, which functions as a vehicle body frame portion, on the top surfaces of the floor panels 3, 4. The front bottom edge flange portions 29 are respectively welded onto the rear edges of the left and right floor panels 3, 4. Furthermore, as shown in FIG. 1 and FIG. 2, the middle cross member 7 is made of: a linear portion 71 extending orthogonally to the vehicle length direction; and forwardly inclined portions (obliquely extending portions) 72, 72 formed in a bend from the left and right ends of the linear portion 71 in obliquely forward directions in a planar view. Inside the closed section structure H3, bulkheads 73 as reinforcement members are joined so as to partition the linear portion 71 from the forwardly inclined portions 72.

To rear walls of the forwardly inclined portions 72, 72 of the middle cross member 7 and rear inner walls of the left and right side sills 5, 6, there are respectively connected front end portions of left and right rear side frames 15, 16. Relative positions respectively between the bulkheads 73, 73 and inner walls of the rear side frames 15, 16 are substantially aligned.

The front cross members 9, 10 are members with a hat-shaped cross section opening downwardly. Flange portions 31, 31 at the front and rear of the front cross members 9, 10 are respectively joined to top surfaces of the left and right floor panels 3, 4. As a result, closed section structures H4 are formed as vehicle body frame portions along the vehicle width direction on the top surfaces of the floor panels 3, 4. Outside ends of the front cross members 9, 10 are joined to side walls 26 which include top walls of the side sill inners 23. On the other hand, in inside ends of the front cross members 9, 10, as shown in FIG. 1 and FIG. 2, a front flange portion 32 and a rear flange portion 33 thereof are joined to an outer surface of the side wall 18 of the floor tunnel frame 2. Furthermore, end edges of top walls 34 of the front cross members 9, 10 are joined to the top wall 17 of the floor tunnel frame 2.

Here, as shown in FIGS. 1 through 3, on a backside of the tunnel main body 19 of the floor tunnel frame 2, a joint frame 35 is joined to positions at which the left and right front cross members 9, 10 are connected. This joint frame 35 is a member with a hat-shaped cross section that opens upwardly, opposite to the case of the front cross members 9, 10. A bottom wall 36 of the joint frame 35 is aligned with the surfaces of the floor panels 3, 4. A front side flange 37 and rear side flange 38 (see FIG. 1 and FIG. 2) of the joint frame 35 are joined to the backside of the tunnel main body 19. Both of end edges 39, 39 of the bottom wall 36 are joined to the backside of the tunnel main body 19 of the floor tunnel frame 2. Note that the left and right front cross members 9, 10 are omitted in FIG. 3.

As a result, a closed section structure H5 is formed between the joint frame 35 and the floor tunnel frame 2. This closed section structure H5 connects with the closed section structures H4 formed respectively between the left and right front cross members 9, 10 and the floor panels 3, 4, to thereby form a substantially continuous vehicle frame member which connects the side sills 5, 6 along the vehicle width direction.

Figure 5:
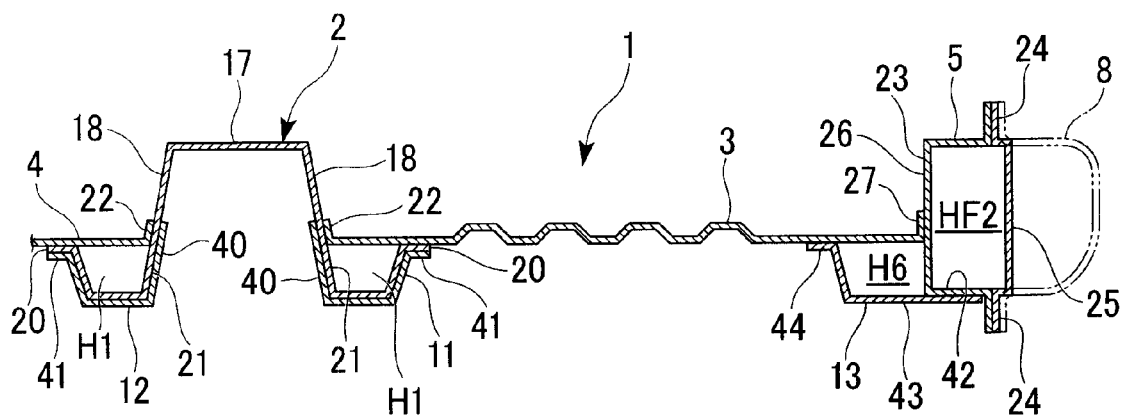
FIG. 5 is a cross-sectional view, taken along the C-C line of FIG. 2.

As shown in FIG. 5, one end of each of the left and right extensions 11, 12 is formed in a shape which opens upwardly so as to cover the entire surface of the wing portion 21 of the floor tunnel frame 2 from below. Top ends of inside walls 40 of the left and right extensions 11, 12 are positioned substantially at the same height as those of the flange portions 22 of the floor panels 3, 4. The top ends thereof are joined to back surfaces of the side walls 18 of the tunnel main body 19 of the floor tunnel frame 2. Flange portions 41 on the outside of the other ends of the extensions 11, 12 are joined to the flange portions 20 of the wing portions 21.

The outriggers 13, 14 respectively include: a bottom wall 43 joined to a bottom wall 42 of the respective side sill inners 23, 23; and a rising flange portion 44 joined to the bottom surface of the respective floor panels 3, 4. As a result, the outriggers 13, 14 form closed section structures H6 respectively between the side sills 5, 6 and the floor panels 3, 4.

The outriggers 13, 14 extend inwardly in the vehicle width direction as they extend from a joint portion between the side sill inners 23, 23 toward the front of the vehicle body. The front ends thereof are positioned at substantially the center between the floor tunnel frame 2 and the side sills 5, 6, respectively, in the vehicle width direction. That is, the outriggers 13, 14 extend obliquely with respect to the longitudinal direction in a planar view, and connect with the side sill inners 23, 23, respectively.

Figure 6:
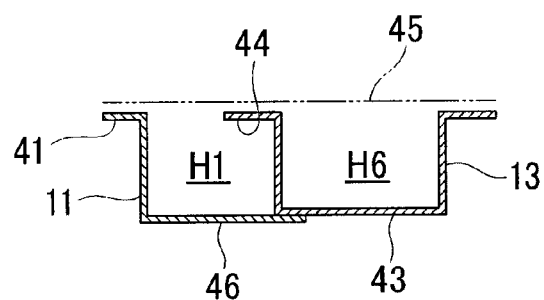
FIG. 6 is a cross-sectional view, taken along the B-B line of FIG. 2.
Figure 7:
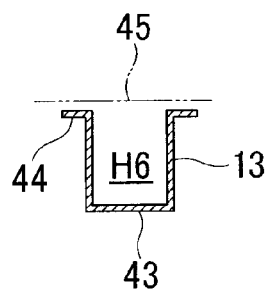
FIG. 7 is a cross-sectional view, taken along the A-A line of FIG. 2.

As shown with a double-dotted chain line in FIG. 4, front end portions of the extensions 11, 12 and the outriggers 13, 14 are formed so as to gradually rise forward along the backside surface of a dashboard panel 45 joined to top surfaces of front edges of the floor panels 3, 4. As shown in FIG. 6 and FIG. 7, to the bottom walls 43 of the outriggers 13, 14 whose front side is formed in a hat-shaped cross section, there are respectively joined bottom walls 46 of the extensions 11, 12, and thereby the outriggers 13, 14 are connected to the extensions 11, 12, respectively. That is, the front end portions of the floor tunnel frame 2 are connected with the front end portions of the left and right side sills 5, 6 in the vehicle width direction by means of the extensions 11, 12 and the outriggers 13, 14, respectively. That is, the extensions 11, 12 and the outriggers 13, 14 constitute lateral frame members. The outriggers 13, 14 constitute obliquely extending portions of the lateral frame members.

To a front end of the outrigger 13, there is connected a rear end of a front side frame 74 (see FIG. 2). Note that the double-dotted chain line in FIG. 6 and FIG. 7 shows the dashboard panel 45 which forms the closed section structures H6 respectively between the outriggers 13, 14 and itself, and also forms the closed section structures H1 respectively between the outriggers 13, 14 as well as the extensions 11, 12 and itself.

As shown in FIG. 1 and FIG. 2, on the floor panels 3, 4, there are regularly provided a plurality of wave-formed beads 50 over substantially the entire surface thereof and also provided a plurality of drain holes 51 and a plurality of positioning holes 52. The floor panels 3, 4 are formed in a laterally symmetrical manner with respect to the floor tunnel frame 2. Furthermore, the beads 50, drain holes 51, and positioning holes 52 formed respectively on the floor panels 3, 4 are arranged in a laterally symmetrical manner with respect to the floor tunnel frame 2. Hereunder is a detailed description only of the left floor panel 3, and the description of the right floor panel 4 is omitted.

In the cross-sectional views of FIG. 3 to FIG. 5, a cross-sectional shape of the bead 50, which is a complicated shape, is shown as a simple shape for convenience of illustration in the figures.

In the floor panel 3, the forward part and the backward part across the front cross member 9 are different from each other in the arrangement pattern of the beads 50.

A substantially rectangular region (hereinafter, referred to as a forward region) S1 further forward than the front cross member 9 in the floor panel 3 has a plurality of beads 50 provided in a concentric arc-shaped manner at regular intervals, with the center at an intersection X1 of a center of the cross-section of one end of the outrigger 13 and the inside wall 26 of the side sill inner 23. One end of each of the beads 50 is orthogonal to the inside wall 26 of the side sill inner 23. The other end of each of the beads 50 is adjacent to the outrigger 13 or the extension 11. Here, some of the other end of each of the beads 50 extend, within a width of the front side frame 74 connected to the outrigger 13, so as to be orthogonal to the width direction. They are positioned in the vicinity of a connection portion Q between the extension 11 and the outrigger 13.

On the other hand, a substantially rectangular region (hereinafter, referred to as a backward region) S2 further backward than the front cross member 9 in the floor panel 3 has a plurality of beads 50 provided in a concentric arc-shaped manner at regular intervals, with the center at an intersection X2 of a center of the cross-section of the forwardly inclined portion 72 on the left side of the middle cross member 7 and the inside wall 26 of the side sill inner 23. One end of each of the beads 50 is orthogonal to the inside wall 26 of the side sill inner 23. The other end of each of the beads 50 is adjacent to the middle cross member 7. Some of the other end of each of the beads 50 extends so as to be orthogonal to the linear portion 71 of the middle cross member 7.

The bead 50 is formed by stamping into a trapezoidal shape protruding above a general surface. Between the adjacent beads 50, 50, there is formed a valley portion 53.

A plurality of beads 50 are provided in this manner, to thereby enhance the rigidity of the floor panels 3, 4. The height of the bead 50 can be appropriately set according to the tradeoffs between the rigidity required for the floor panels 3, 4 and the vehicle interior space.

Furthermore, as shown in FIG. 1 and FIG. 2, in the forward region S1, the drain holes 51 and the positioning hole 52 are arranged on a line orthogonal to the beads 50, the line being adjacent to a diagonal line from a joint portion between the outrigger 13 and the side sill inner 23 to a joint portion between the floor tunnel frame 2 and the front cross member 9. On the other hand, in the backward region S2, the drain holes 51 and the positioning hole 52 are arranged on a line orthogonal to the beads 50, the line being adjacent to a diagonal line from a joint portion between the front tunnel frame 2 and the front cross member 9 to a joint point between the middle cross member 7 and the side sill inner 23.

A single drain hole 51 is provided at the center of every valley portion 53 between the adjacent beads 50, 50. These drain holes 51 are for draining electrodeposition solution from the floor panel 3 when the floor panel 3 is taken out of the electrodeposition solution pool in the electrodeposition process for the floor panel 3.

A single positioning hole 52 is provided in each of the forward region S1 and backward region S2 of the floor panel 3. Each of the positioning holes 52 is provided at a portion where the two adjacent beads 50, 50 are combined. These positioning holes 52 are for positioning the floor panels 3, 4 by inserting positioning jigs into the positioning holes 52 when assembling the floor 1.

Figure 8:
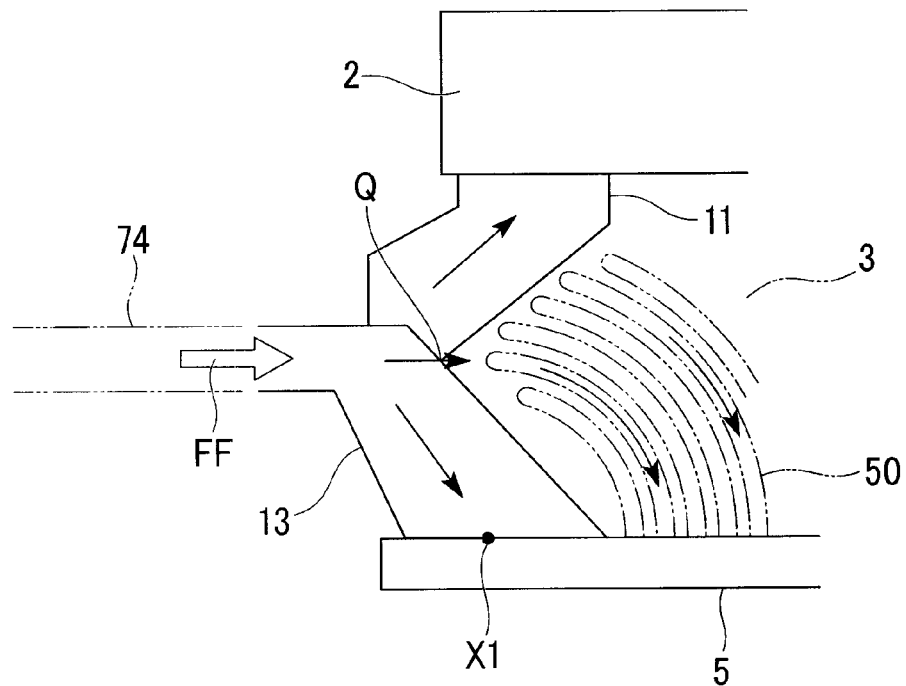
FIG. 8 is a schematic view for describing the load transmission at the time of a frontal vehicular collision in the floor for a vehicle according to the same embodiment.
Figure 9:
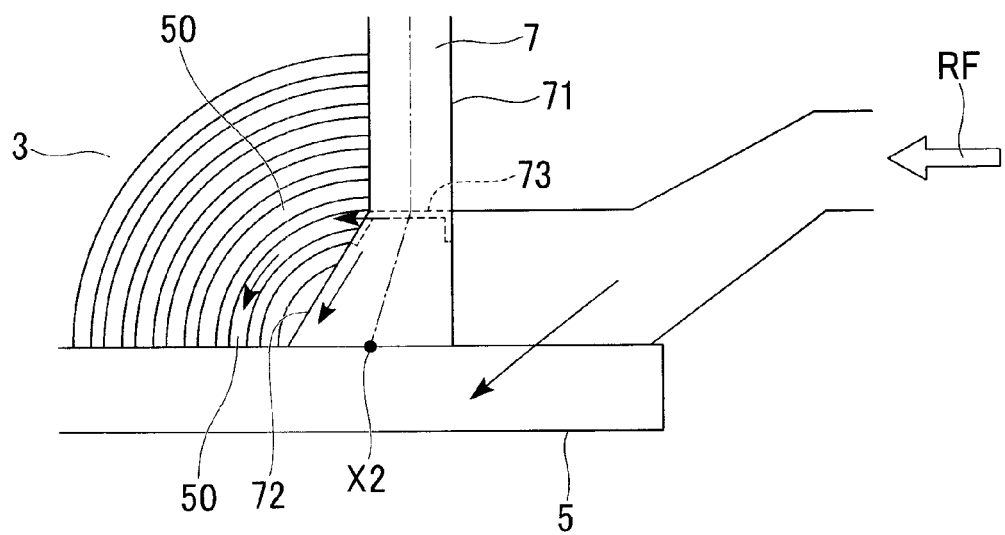
FIG. 9 is a schematic view for describing the load transmission at the time of a rear vehicular collision in the floor for a vehicle according to the same embodiment.

Load transmission in the vehicle floor structure with the above construction when a collision load by a frontal vehicular collision via the front side frame 74 is applied and when a collision load by a rear vehicular collision via the rear side frame 15 is applied is described with reference to FIG. 8 and FIG. 9, taking the left side of the floor 1 as an example. FIG. 8 and FIG. 9 are schematic diagrams showing the floor structure in a simplified manner. In FIG. 8, the floor panel 3 is omitted for convenience of description.

As shown in FIG. 8, a collision load FF input from the front side frame 74 to the outrigger 13 at a frontal vehicular collision is directly transmitted to the side sill 5 via the outrigger 13 which is connected obliquely to the side sill 5 and is also transmitted to the side sill 5 via the floor panel 3. In addition, the collision load FF is also transmitted to the floor tunnel frame 2 via the extension 11. Because the collision load FF is distributed in this manner, the load burden on the floor tunnel frame 2 or the floor panel 3 is decreased. Consequently, reinforcement for the floor tunnel frame 2 can be reduced. Thereby, the weight of the floor tunnel frame 2 can be reduced. Furthermore, the burden on the floor panel 3 is also decreased. Therefore, the weight of the floor panel 3 can also be reduced. That is, the weight of the vehicle body can be decreased, thus contributing to improvements in fuel efficiency.

Furthermore, when transmitted to the side sill 5 via the floor panel 3, the load is transmitted along the longitudinal direction of the beads 50. Here, as for some of the beads 50, one end of each thereof is orthogonal to the side sill 5, and the other end of each thereof extends within a width of the front side frame 74 so as to be orthogonal to the width direction. As a result, the beads 50 can receive and hold, in a head-on manner, the collision load transmitted from the outrigger 13. This makes the beads 50 unlikely to be bent. As a result, the floor panel 3 becomes unlikely to be deformed. Therefore, the load transmitted to the floor panel 3 can be effectively transmitted to the side sill 5.

On the other hand, as shown in FIG. 9, a collision load RF input to the rear side frame 15 at the time of a rear vehicular collision is directly transmitted to the side sill 5 and is also transmitted to the middle cross member 7 via the rear side frame 15 obliquely connected to the side sill 5. Furthermore, the load transmitted to the middle cross member 7 is directly transmitted to the side sill 5 via the forwardly inclined portion 72 of the middle cross member 7 obliquely connected to the side sill 5, and is also transmitted to the side sill via the floor panel 3. Because the collision load RF is distributed in this manner, a load burden on the floor panel 3 is reduced, allowing the weight reduction of the floor panel 3. That is, the weight of the vehicle can be reduced, thus allowing contribution to improvements in fuel efficiency.

Especially in the present embodiment, the bulkhead 73 is provided in the connection portion between the linear portion 71 and the forwardly inclined portion 72 of the middle cross member 7. Besides, the bulkhead 73 and the inner wall of the rear side frame 15 are arranged in a substantially aligned manner. Therefore, when the collision load RF acts on the middle cross member 7, the bulkhead 73 prevents the deformation of the middle cross member 7. As a result, load transmission to the side sill 5 via the forwardly inclined portion 72 and load transmission to the side sill 5 via the floor panel 3 can be effectively performed.

Furthermore, when transmitted to the side sill 5 via the floor panel 3, the load is transmitted along the longitudinal direction of the beads 50. Here, as for some of the beads 50, one end of each thereof is orthogonal to the side sill 5, and the other end of each thereof extends so as to be orthogonal to the linear portion 71 of the middle cross member 7. As a result, the beads 50 can receive and hold, in a head-on manner, the collision load transmitted from the linear portion 71 of the middle cross member 7. This makes the beads 50 unlikely to be bent. As a result, the floor panel 3 becomes unlikely to be deformed. Therefore, the load transmission to the side sill 5 via the floor panel 3 can be effectively performed.

Note that the present invention is not limited to the aforementioned embodiment.

For example, although in the aforementioned embodiment, the bead is trapezoidal in cross section, the bead may be semicircular, triangular, or the like in cross section.

Next is a description of a second embodiment of the present invention based on the drawings.

Figure 10:
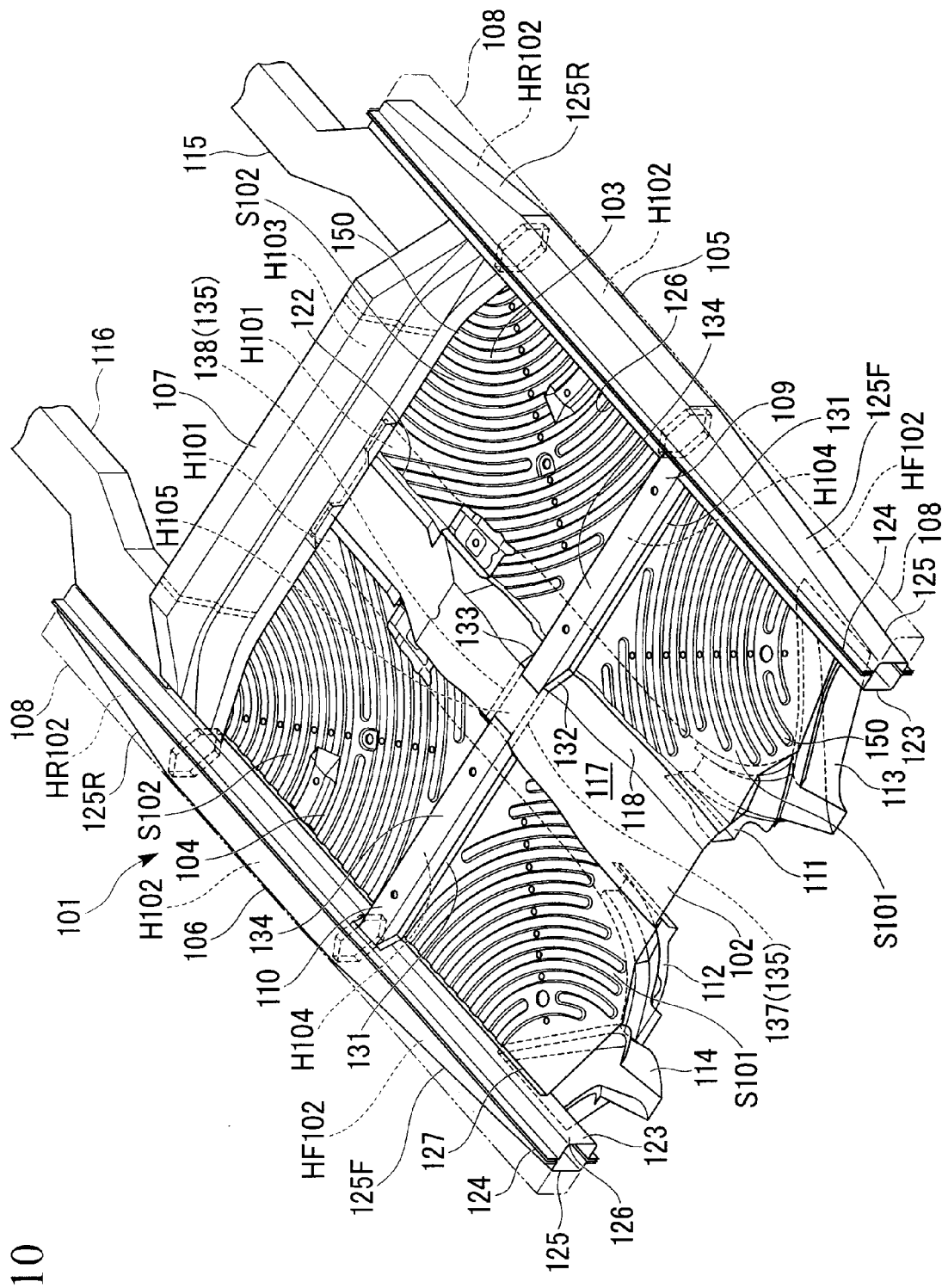
FIG. 10 is a perspective view of a floor for a vehicle according to a second embodiment of the present invention.
Figure 11:
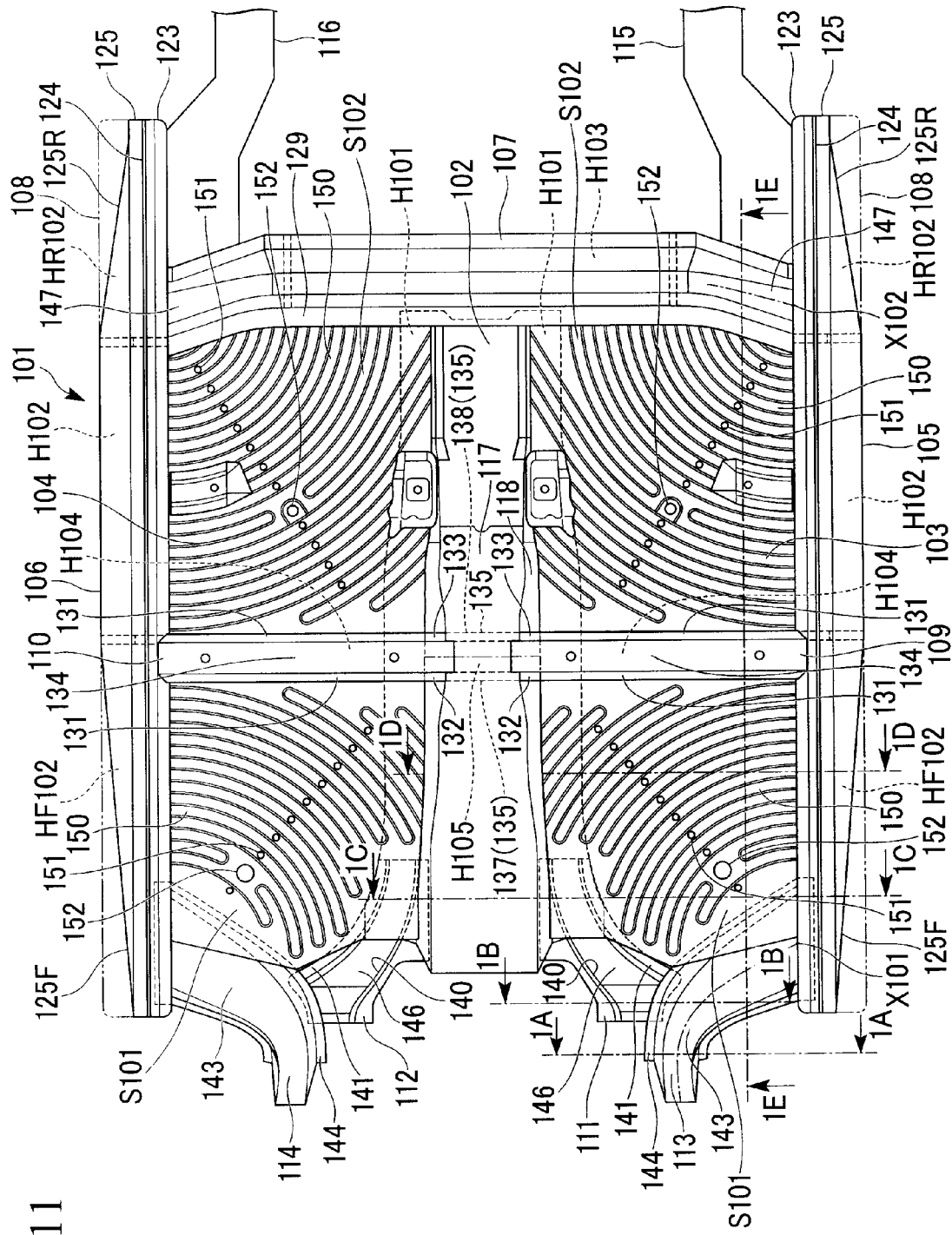
FIG. 11 is a planar view of the floor for a vehicle according to the same embodiment.

As shown in FIG. 10 and FIG. 11, in a floor 101 of a vehicle, a floor tunnel frame 102 extending in the vehicle length direction is formed along a central portion in the vehicle width direction. To both edges of this floor tunnel frame 102, there are joined inside edges of left and right floor panels 103, 104. To outside edges of the left and right floor panels 103, 104, there are fixed left and right side sills 105, 106, which are vehicular frame members extending in the vehicle length direction. That is, the left and right floor panels 103, 104 are bridged respectively between the floor tunnel frame 102 and the left and right side sills 105, 106. Rear portions of the left and right side sills 105, 106 are connected to each other by means of a middle cross member 107 which is a vehicular frame member arranged in the vehicle width direction. A front edge portion of the middle cross member 107 is joined to rear edges of the left and right floor panels 103, 104. Furthermore, a substantially central portion in the longitudinal direction of the floor tunnel frame 102 is connected to the left and right side sills 105, 106 by means of left and right front cross members 109, 110 arranged in the vehicle width direction, respectively.

On the other hand, to walls of both sides of a front end portion of the floor tunnel frame 102, there are respectively joined one end of each of extensions 111, 112. To front end portions of the left and right side sills 105, 106, there are respectively joined one end of each of outriggers 113, 114. These left and right extensions 111, 112 are respectively connected to inside walls of the outriggers 113, 114. Left and right end portions 147, 147 of the middle cross member 107 are bent in an obliquely forward direction. To rear walls of these left and right end portions 147, 147 and to rear inner walls of the left and right side sills 105, 106, there are connected front end portions of left and right rear side frames 115, 116. The floor panels 103, 104 and the floor tunnel frame 102 are main components of the floor 101.

The left and right extensions 111, 112 and the outriggers 113, 114 which are constructed in this manner function as lateral frame members in that they connect the side sills 105, 106 with the floor tunnel frame 102 in the vehicle width direction.

Figure 12:
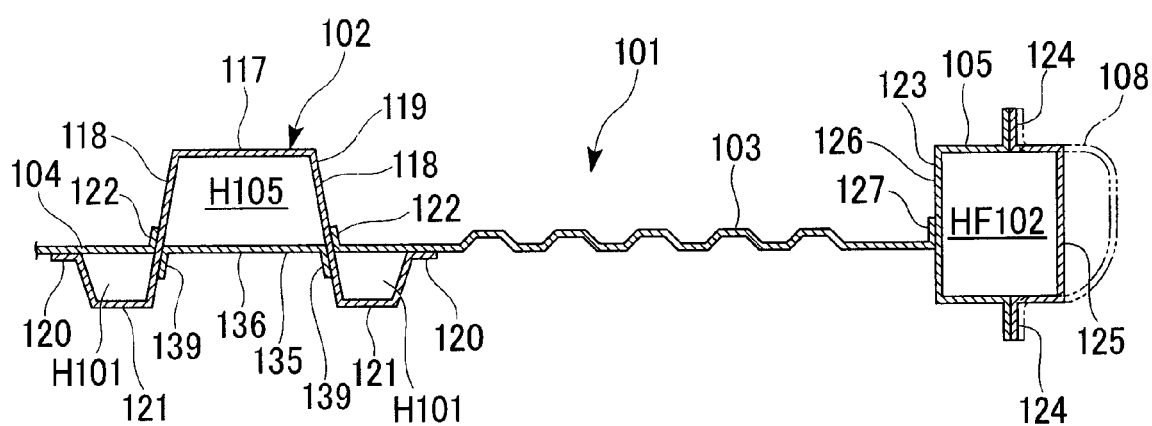
FIG. 12 is a cross-sectional view, taken along the 1D-1D line of FIG. 11.

As shown in FIG. 12, the floor tunnel frame 102 is made of a tunnel main body 119 and wing portions 121, 121. The tunnel main body 119 is made of a top wall 117 and two inclined side walls 118, 118 so as to form a convex above floor panels 103, 104. Wing portions 121, 121 extend outwardly from bottom ends of both the inclined side walls of the tunnel main body 119 extending below surfaces of the left and right floor panels 103, 104, and respectively welded onto bottom surfaces of the floor panels 103, 104 in flange portions 120. On the inside edges of the left and right floor panels 103, 104, there are respectively formed flange portions 122 in a rising manner. These flange portions 122 are welded onto both the side walls 118, 118 of the tunnel main body 119 of the floor tunnel frame 102.

That is, outside both the side walls 118, 118 of the floor tunnel frame 102, and below the floor panels 103, 104, there are formed closed section structures H101 formed of the wing portions 121, 121 of the floor tunnel frame 102 and the floor panels 103, 104.

Each of the side sills 105, 106 is made of: a side sill inner 123 formed in a convex shape on the vehicle interior side, that is, in a U-shaped cross-section opening toward the outside; a reinforcement 125; and a side sill outer 108. The reinforcement 125 has a U-shaped cross-section opening toward the inside and is joined to the side sill inner 123 in top and bottom joint flange portions 124, 124 to form a closed section structure. The side sill outer 108 is joined to the joint flange portions 124 to form a closed section structure outside the reinforcement 125. The side sill inner 123 is formed in a linear shape with the same cross-section over substantially all the length. On the other hand, as shown in FIG. 10 and FIG. 11, the reinforcement 125 is made of a front inclined wall 125F and a rear inclined wall 125R which have a more outwardly protruding dimension as they extend respectively from the front and rear ends to the center in the longitudinal direction These front inclined wall 125F and rear inclined wall 125R form inclined closed section structures HF102, HR102. A maximally protruded, closed section structure H102 in the reinforcement 125 whose protruding dimension to the outside is maximum is formed over a predetermined length in the vehicle length direction. The maximally protruded, closed section structures H102 are arranged between the middle cross member 107 and the front members 109, 110. To inside walls 126 of the side sill inners 123, there are respectively joined flange portions 127 which are formed at outside edges of the left and right floor panels 103, 104 in a rising manner.

Figure 13:
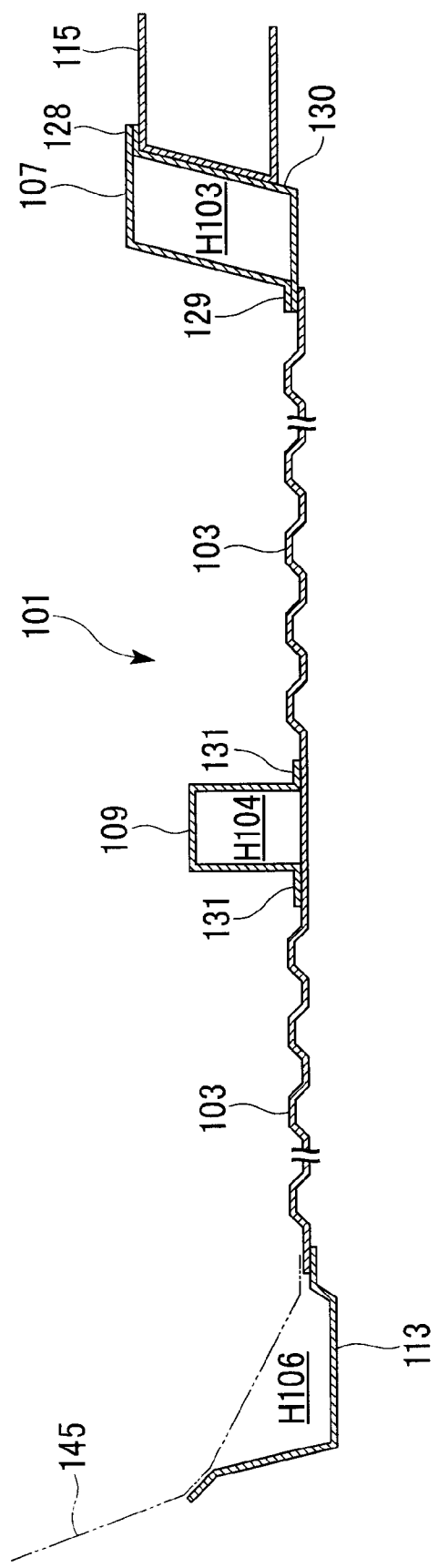
FIG. 13 is a cross-sectional view, taken along the 1E-1E line of FIG. 11.

As shown in FIG. 13, the middle cross member 107 is formed of two opposingly arranged members with substantially an L-shaped cross-section, in which rear top edge flange portions 128 of the members are welded onto opposing front bottom edge flange portions 129 of the members, respectively. This middle cross member 107 forms a closed section structure H103 with a substantially rectangular shape, which functions as a vehicle body frame portion, on the top surfaces of the floor panels 103, 104. The front bottom edge flange portions 129 are respectively welded onto the rear edges of the left and right floor panels 103, 104. To a rear wall 130, there are joined front end portions of the left and right rear side frames 115, 116.

The front cross members 109, 110 are members with a hat-shaped cross section opening downwardly. Flange portions 131, 131 at the front and rear of the front cross members 109, 110 are respectively joined to top surfaces of the left and right floor panels 103, 104. As a result, closed section structures H104 are formed as a vehicle body frame portion along the vehicle width direction on the top surfaces of the floor panels 103, 104. Outside ends of the front cross members 109, 110 are joined to side walls 126 which include top walls of the side sill inners 123. On the other hand, in inside ends of the front cross members 109, 110, as shown in FIG. 10 and FIG. 11, a front flange portion 132 and a rear flange portion 133 thereof are joined to an outer surface of the side wall 118 of the floor tunnel frame 102. Furthermore, end edges of top walls 134 of the front cross members 109, 110 are joined to the top wall 117 of the floor tunnel frame 2.

Here, as shown in FIGS. 10 through 12, on a backside of the tunnel main body 119 of the floor tunnel frame 102, a joint frame 135 is joined to positions at which the left and right cross members 109, 110 are connected. This joint frame 135 has a hat-shaped cross section that opens upwardly, opposite to the case of the front cross members 109, 110. A bottom wall 136 of the joint frame 135 is aligned with the surfaces of the floor panels 103, 104. A front side flange 137 and rear side flange 138 (see FIG. 10 and FIG. 11) of the joint frame 135 are joined to the backside of the tunnel main body 119. Both of end edges 139, 139 of the bottom wall 136 are joined to the backside of the tunnel main body 119 of the floor tunnel frame 102. Note that the left and right front cross members 109, 110 are omitted in FIG. 12.

As a result, a closed section structure H105 is formed between the joint frame 135 and the floor tunnel frame 102. This closed section structure H105 connects with each of the closed section structures H104 formed between the left and right front cross members 109, 110 and the floor panels 103, 104, to thereby form a substantially continuous vehicle frame member which connects the side sills 105, 106 along the vehicle width direction.

Figure 14:
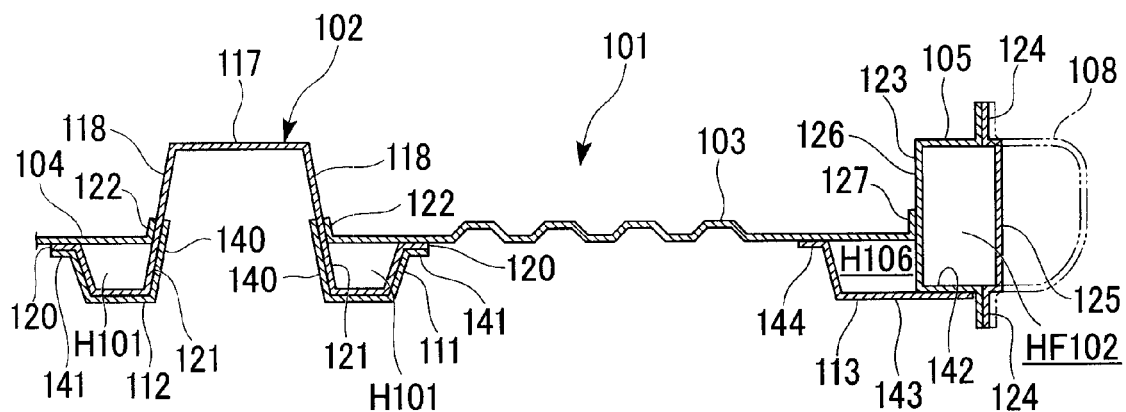
FIG. 14 is a cross-sectional view, taken along the 1C-1C line of FIG. 11.

As shown in FIG. 14, one end of each of the left and right extensions 111, 112 is formed in a shape which opens upwardly so as to cover the entire surface of the wing portion 121 of the floor tunnel frame 102 from below. Top ends of inside walls 140 of the left and right extensions 111, 112 are positioned substantially at the same height as those of the flange portions 122 of the floor panels 103, 104. The top ends thereof are joined to back surfaces of the side walls 118 of the tunnel main body 119 of the floor tunnel frame 102. Flange portions 141 on the outside of the other ends of the extensions 111, 112 are joined to the flange portions 120 of the wing portions 121.

The outriggers 113, 114 respectively include: a bottom wall 143 joined to a bottom wall 142 of the respective side sill inners 123, 123; and a rising flange portion 144 joined to the bottom surface of the respective floor panels 103, 104. As a result, the outriggers 113, 114 form closed section structures H106 respectively between the side sills 105, 106 and the floor panels 103, 104.

Figure 15:
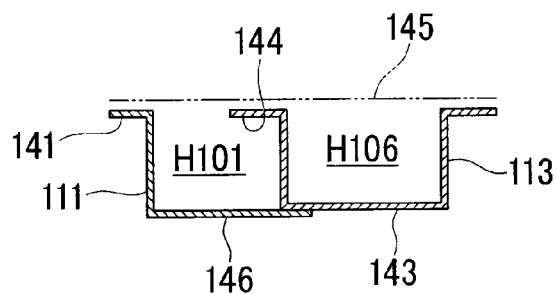
FIG. 15 is a cross-sectional view, taken along the 1B-1B line of FIG. 11.
Figure 16:
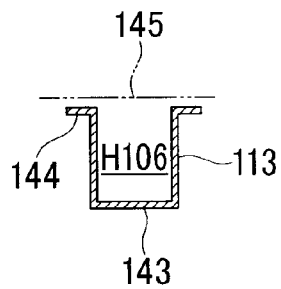
FIG. 16 is a cross-sectional view, taken along the 1A-1A line of FIG. 11.

As shown with a double-dotted chain line in FIG. 13, front end portions of the extensions 111, 112 and the outriggers 113, 114 are formed so as to gradually rise forward along a backside surface of a dashboard panel 145 joined to top surfaces of front edges of the floor panels 103, 104. As shown in FIG. 15 and FIG. 16, to the bottom walls 143 of the outriggers 113, 114 whose front side is formed in a hat-shaped cross section, there are respectively joined bottom walls 146 of the extensions 111, 112, and thereby these two are connected.

To a front end of the outrigger 113, there is connected a rear end of a front side frame (not shown in the figure). Note that the double-dotted chain line in FIG. 15 and FIG. 16 shows the dashboard panel 145 which forms the closed section structures H106 respectively between the outriggers 113, 114 and itself, and also forms the closed section structures H101 respectively between the outriggers 113, 114 as well as the extensions 111, 112 and itself.

As shown in FIG. 10 and FIG. 11, on the floor panels 103, 104, there are regularly provided a plurality of wave-formed beads 150 over substantially the entire surface thereof and also provided a plurality of drain holes 151 and a plurality of positioning holes 152. The floor panels 103, 104 are formed in a laterally symmetrical manner with respect to the floor tunnel frame 102. Furthermore, the beads 150, drain holes 151, and positioning holes 152 formed respectively on the floor panels 103, 104 are arranged in a laterally symmetrical manner with respect to the floor tunnel frame 102. Hereunder is a detailed description only of the left floor panel 103. As for the right floor panel, like parts are designated with like reference numerals, and the description thereof is omitted. In the cross-sectional views of FIG. 12 to FIG. 14, a cross-sectional shape of the bead 150, which is a complicated shape, is shown as a simple shape for convenience of illustration in the figures.

In the floor panel 103, the forward part and the backward part across the front cross member 109 are different from each other in the arrangement pattern of the beads 150.

A region S101 in the floor panel 103 which is surrounded by the floor tunnel frame 102, the front cross member 109, the extension 111, and the outrigger 113 has a plurality of the beads 150 provided in a concentric arc-shaped manner at regular intervals, with the center at an intersection X101 of a center of the cross-section of one end of the outrigger 113 and the inside wall 126 of the side sill inner 123. One of each end of the beads 150 extends, starting orthogonally to the inside wall 126 of the side sill inner 123. Some of the other end of each of the beads 150 extends so as to be orthogonal to a width direction of the front side frame connected to the outrigger 113.

On the other hand, a region S102 in the floor panel 103 which is surrounded by the floor tunnel frame 102, the front cross member 109, and the middle cross member 107 has a plurality of beads 150 provided in a concentric arc-shaped manner at regular intervals, with the center at an intersection X102 of a center of the cross-section at an end portion on the left side of the middle cross member 107 and the inside wall 126 of the side sill inner 123. One of each end of the beads 150 extends, starting orthogonally to the inside wall 126 of the side sill inner 123. The other end of each of the beads 150 extends so as to be orthogonal to the longitudinal direction of the middle cross member 107. The bead 150 is formed by stamping into a trapezoidal shape protruding above a general surface. Between the adjacent beads 150, 150, there is formed a valley portion 153.

A plurality of beads 150 provided in this manner enhance the rigidity of the floor panels 103, 104.

Furthermore, in the forward region S101 further forward than the front cross member 109, the drain holes 151 and the positioning hole 152 are arranged on a diagonal line from a joint portion between the outrigger 113 and the side sill inner 123 to a joint portion between the floor tunnel frame 102 and the front cross member 109. On the other hand, in the backward region S102 further backward than the front cross member 109, the drain holes 151 and the positioning hole 152 are arranged on a diagonal line from a joint portion between the front tunnel frame 102 and the front cross member 109 to a joint point between the middle cross member 107 and the side sill inner 123.

A single drain hole 151 is provided at the center of every valley portion 153 between the adjacent beads 150. These drain holes 151 are for draining electrodeposition solution from the floor panel 103 when the floor panel 103 is taken out of the electrodeposition solution pool in the electrodeposition process for the floor panel 103.

A single positioning hole 152 is provided in each of the regions S101, S102 in the front and at the back of the front cross member 109 in the floor panel 103. Each of the positioning holes 152 is provided at a portion where the peaks of the two adjacent beads 150, 150 are combined.

Figure 17:
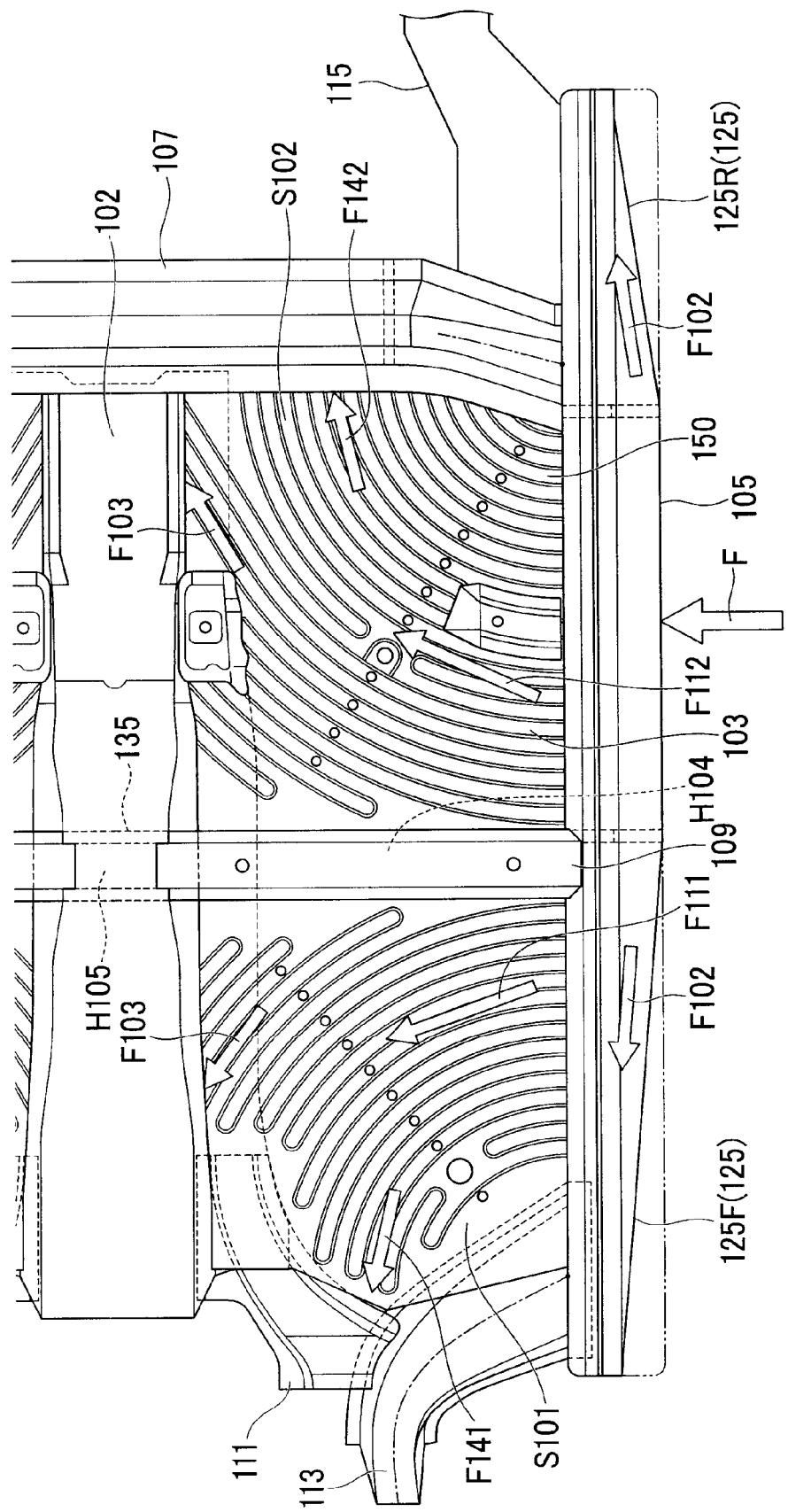
FIG. 17 is an enlarged view of the main part of FIG. 11.

According to the above-mentioned embodiment, as shown in the left floor panel 103 in FIG. 17 by way of example, when an impact load (arrow F100) is applied from the side sill 105 at the time of a side vehicular collision, this impact load F100 is transmitted to the regions S101 and S102 of the floor panel 103 respectively as a load F111 and a load F112. At the same time the impact load F100 is transmitted to the front inclined wall 125F and the rear inclined wall 125R of the reinforcement 125 of the side sill 105, and then is transmitted in a distributed manner also to the extension 111 as well as the outrigger 113 and the middle cross member 107 respectively as a load F102. Moreover, the impact load F100 is transmitted also to the front side frame connected to the outrigger 113 and the rear side frame 115 connected to the side sill 105.

In a floor structure without the front inclined wall 125F and the rear inclined wall 125R, an impact load applied from the side sill 105 acts completely on the floor panel 103 as the load F100. On the other hand, according to the floor structure of the present invention, the front inclined wall 125F and the rear inclined wall 125R provided in the reinforcement 125 of the side sill 105 share the impact load F100 in the obliquely forward and rear directions, allowing a decrease in the burden on the floor panel 103. As a result, the weight of the floor panel can be reduced. That is, the weight of the vehicle can be decreased, thus contributing to improvements in fuel efficiency.

Here, it is also an advantage specific to the present invention that a part of the impact load F100 acting on the side sill 105 is also transmitted to the side sill 106 side via: the closed section structure H104 formed between the front cross member 109 and the floor panel 103; the closed section structure H105 formed between the joint frame 135 and the floor tunnel frame 102; and the closed section structure H104 formed between the front cross member 110 and the floor panel 104.

Furthermore, both of the impact loads F111, F112 having acted on the floor panel 103 can be received by the floor panel 103 whose rigidity is enhanced by the beads 150. Also in this point, the burden on the floor panel 103 can be decreased.

In a floor structure without the formation of the beads 150, the impact loads F111, F112 having acted on the floor panel 103 have to be all borne by the floor panel 103 alone. On the other hand, in the floor structure of the present invention, the loads F111, F112 are transmitted, while being distributed over the floor tunnel frame 102 as: a load F103 acting along the beads 150; a load F141 directed to the extension 111 and the outrigger 113 along a plurality of concentric arc-shaped beads 150 starting orthogonally to the side sill 105; a load F142 directed to the middle cross member 107. Consequently, in the floor tunnel frame 102, the extension 111, the outrigger 113, and the middle cross member 107, the respective distributed loads can be received with reliability, to thereby allow the burden on the floor panel 103 to be extensively reduced. That is, the weight of the floor panel 103 can be reduced, thus contributing to improvements in fuel efficiency.

As described above, an impact load on the side sill 105 can be received by the entirety of the floor structure. Therefore, not only the floor panels 103, 104 but also the respective members can be reduced in weight, to thereby make it possible to fully resist an impact load while improving fuel efficiency.

Note that the present invention is not limited to the aforementioned embodiment. For example, although the bead is trapezoidal in cross-section, the bead may be semicircular, triangular, or the like in cross section.

INDUSTRIAL APPLICABILITY

A vehicle floor structure which, at the time of a frontal vehicular collision or a rear vehicular collision, is unlikely to be deformed and which is capable of effectively distributing a collision load can be provided. Furthermore, a vehicle floor structure which effectively transmits an impact load acting at the time of a side vehicular collision to a floor panel and which is capable of decreasing the load borne by the floor panel can be provided.

The invention claimed is:

1. A vehicle floor structure comprising:
a floor tunnel frame arranged along a center in a vehicle width direction and extending in a vehicle length direction;
side sills arranged on right and left sides of a vehicle body and extending in the vehicle length direction;
a plurality of lateral frame members for connecting the floor tunnel frame with the right and left side sills in the vehicle width direction;
floor panels bridged between the floor tunnel frame and the side sills;
obliquely extending portions that are provided on at least one of the plurality of lateral frame members and extend so as to be inclined with respect to the vehicle length direction in a planar view, connecting respectively with the side sills; and
a plurality of concentric arc-shaped beads that are provided in respective regions surrounded by the floor tunnel frame, the side sills, and the lateral frame members, with centers respectively at intersections of the side sills and the obliquely extending portions, wherein
at least one of the beads in the respective regions has one end extending so as to be orthogonal to the side sill and the other end extending so as to be orthogonal with respect to the vehicle width direction
wherein the side sill comprises:
a side sill inner that linearly extends in the vehicle length direction and is joined to an outside edge of the floor panel, the side sill having a U-shaped cross-section opening toward the outside of the vehicle body;
a side sill reinforcement member that is joined to the outside edge of the vehicle body of the side sill inner via upper and lower joint flange portions, and has a U-shaped cross-section opening toward the inside of the vehicle body, the side sill reinforcement member together with the side sill inner forming a closed section structure;
a front inclined wall provided to an outside wall of the side sill reinforcement member, the front inclined wall protruding longitudinally more toward the outside from a front end thereof to a central portion in the vehicle length direction; and
a rear inclined wall provided to the outside wall of the side sill reinforcement member, the rear inclined wall protruding more toward the outside from a rear end thereof to the central portion in the vehicle length direction.

* * * * *